United States Patent
Imai et al.

(10) Patent No.: US 12,177,750 B2
(45) Date of Patent: Dec. 24, 2024

(54) COMMUNICATION CONTROL DEVICE, MOBILE OBJECT, COMMUNICATION CONTROL METHOD, AND COMPUTER-READABLE STORAGE MEDIUM TO CONTROL, COMMUNICATION PATH USING DIRECT COMMUNICATION BETWEEN MOBILE OBJECTS

(71) Applicant: HONDA MOTOR CO., LTD., Tokyo (JP)

(72) Inventors: Naoko Imai, Tokyo (JP); Ryusuke Tamanaha, Tokyo (JP); Yusuke Oi, Tokyo (JP); Takahiro Iijima, Tokyo (JP); Masaru Otaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 345 days.

(21) Appl. No.: 17/453,656

(22) Filed: Nov. 5, 2021

(65) Prior Publication Data
US 2022/0191661 A1 Jun. 16, 2022

(30) Foreign Application Priority Data
Dec. 15, 2020 (JP) ................................. 2020-207988

(51) Int. Cl.
*H04W 4/46* (2018.01)
*H04L 45/12* (2022.01)
(Continued)

(52) U.S. Cl.
CPC ............... *H04W 4/46* (2018.02); *H04L 45/12* (2013.01); *H04W 4/80* (2018.02); *H04W 28/10* (2013.01)

(58) Field of Classification Search
CPC ......... H04W 4/46; H04W 4/80; H04W 28/10; H04L 45/12
(Continued)

(56) References Cited

U.S. PATENT DOCUMENTS

2002/0173310 A1 11/2002 Ebata
2005/0237973 A1* 10/2005 Takeda .................. H04W 40/12
370/341

(Continued)

FOREIGN PATENT DOCUMENTS

JP     2002016541 A   1/2002
WO    2018008587 A1   1/2018

OTHER PUBLICATIONS

Office Action issued for counterpart Chinese Application 202111221567.8, issued by The State Intellectual Property Office of People's Republic of China on Sep. 27, 2024.

*Primary Examiner* — Nicholas R Taylor
*Assistant Examiner* — Chong G Kim

(57) ABSTRACT

A communication control device controls wireless communication of a mobile object. The wireless communication includes: a cost information obtaining unit for obtaining from another mobile object being in surroundings of the mobile object, cost information representing a cost for the other mobile object to perform direct wireless communication between mobile objects; a connection information obtaining unit for obtaining communication connection information available for the other mobile object; a communication path setting unit for setting, based on the communication connection information, a plurality of communication paths including a communication path using direct communication with the other mobile object; and a communication path selecting unit for selecting, based on the cost information obtained by the cost information obtaining unit and the communication connection information (Continued)

obtained by the connection information obtaining unit, a communication path to be used for data communication among the plurality of communication paths.

15 Claims, 5 Drawing Sheets

(51) Int. Cl.
 *H04W 4/80* (2018.01)
 *H04W 28/10* (2009.01)
(58) Field of Classification Search
 USPC .......................................................... 370/235
 See application file for complete search history.

(56) References Cited

U.S. PATENT DOCUMENTS

| | | | |
|---|---|---|---|
| 2008/0037560 A1* | 2/2008 | Jia | H04L 45/20 370/351 |
| 2008/0114542 A1 | 5/2008 | Nambata | |
| 2008/0167033 A1* | 7/2008 | Beckers | H04W 15/8044 455/432.3 |
| 2011/0080853 A1* | 4/2011 | Thubert | H04L 45/48 370/255 |
| 2014/0164582 A1* | 6/2014 | Dawson | H04W 48/18 709/221 |
| 2015/0220321 A1* | 8/2015 | Jung | H04L 67/12 717/169 |
| 2015/0282061 A1* | 10/2015 | Matthews | H04W 4/027 455/404.1 |
| 2015/0312347 A1* | 10/2015 | Yun | H04W 4/44 709/217 |
| 2016/0112941 A1* | 4/2016 | Desai | H04L 12/145 370/329 |
| 2017/0094515 A1* | 3/2017 | Salo | H04L 63/102 |
| 2018/0063767 A1* | 3/2018 | Matos | H04W 40/026 |
| 2018/0176845 A1* | 6/2018 | Visuri | H04W 36/0072 |
| 2018/0310243 A1* | 10/2018 | Yoshino | H04W 64/00 |

\* cited by examiner

COMMUNICATION CONTROL DEVICE, MOBILE OBJECT, COMMUNICATION CONTROL METHOD, AND COMPUTER-READABLE STORAGE MEDIUM TO CONTROL, COMMUNICATION PATH USING DIRECT COMMUNICATION BETWEEN MOBILE OBJECTS

The contents of the following Japanese patent application are incorporated herein by reference:

Japanese Patent Application NO. 2020-207988 filed on Dec. 15, 2020

BACKGROUND

1. Technical Field

The present invention relates to a communication control device, a mobile object, a communication control method, and a computer-readable storage medium.

2. Related Art

Described in Patent Document 1 is a mobile communication device for detecting a first communication path that connects to the internet through a first mobile communication device, and a second communication path that connects to the internet through a second mobile communication device using a second communication scheme, and selecting either of the detected first communication path and second communication path by taking a communication speed into consideration.

PRIOR ART DOCUMENT

Patent Document

Patent Document 1: Specification of International Publication WO 2018/008587

DESCRIPTION OF EXEMPLARY EMBODIMENTS

Hereinafter, the present invention will be described through embodiments of the invention, but the following embodiments do not limit the claimed invention. Some combinations of features described in the embodiments may be unnecessary for means to solve the problem in the invention.

Figure 1:
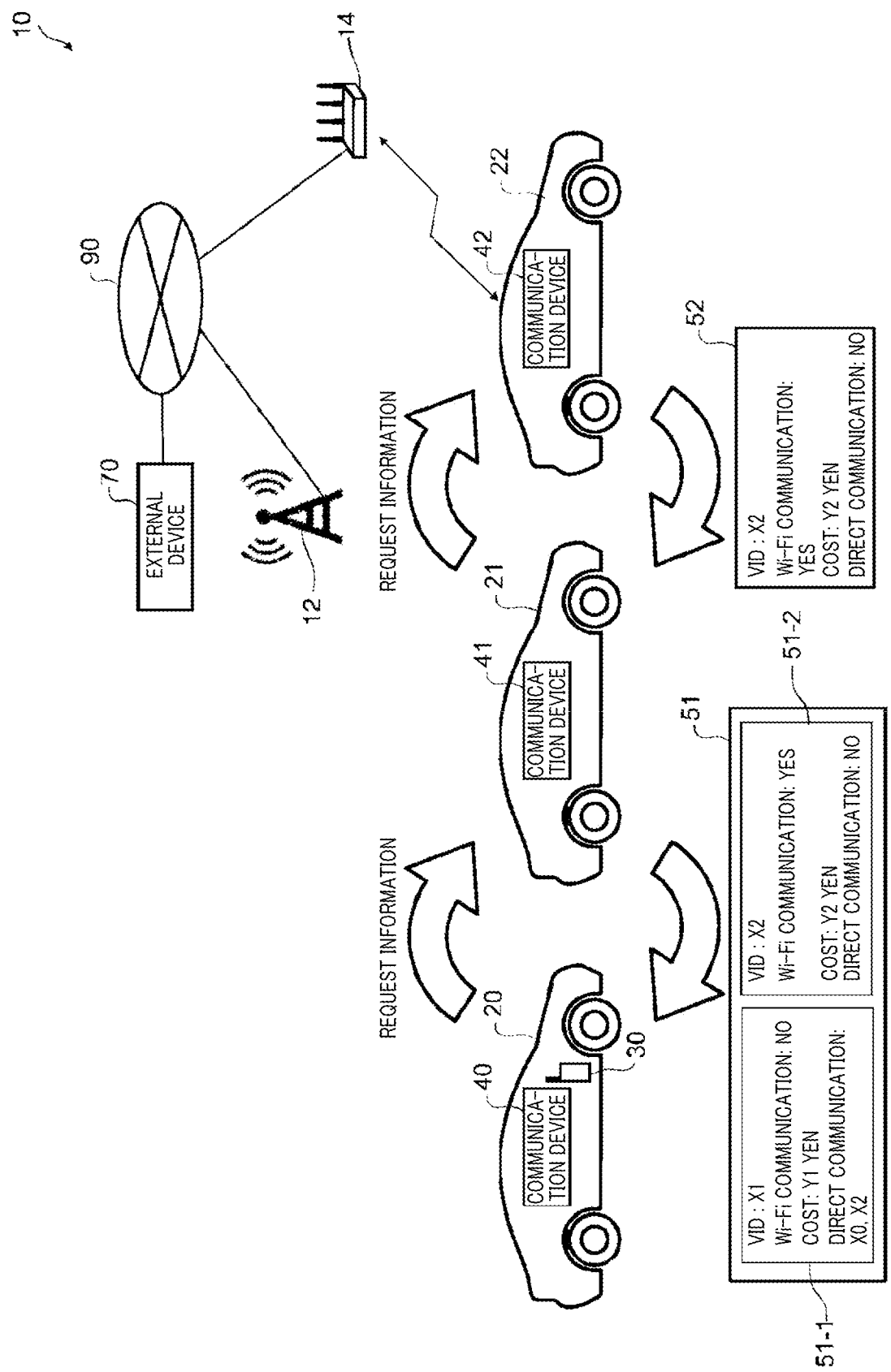
FIG. 1 schematically shows a usage scene for a communication system 10.

FIG. 1 schematically shows a usage scene for a communication system 10. The communication system 10 includes a vehicle 20, a vehicle 21, a vehicle 22, an external device 70, a base station 12, and a wireless access point 14. The vehicle 20, the vehicle 21, and the vehicle 22 are automobiles. The vehicle 20, the vehicle 21, and the vehicle 22 are examples of "mobile objects".

The communication network 90 includes an IP network, a P2P network, and a dedicated line including a VPN of the internet or the like, a virtual network, a mobile communication network, etc. The communication network 90 is connected to the base station 12 and the wireless access point 14. The base station 12 belongs to a mobile communication network.

The wireless access point 14 is a wireless LAN access point, for example. The wireless access point 14 may be a public wireless LAN access point. The wireless access point 14 may be installed in transportation infrastructure. The wireless access point 14 may be installed in a facility near transportation infrastructure. The wireless access point 14 may be installed in a car park or the like.

The vehicle 20 includes a communication device 40. The vehicle 21 includes a communication device 41. The vehicle 22 includes a communication device 42. The communication device 40, the communication device 41, and the communication device 42 have the same function. Specifically, each of the communication device 40, the communication device 41, and the communication device 42 has a function of performing mobile communication through the base station 12, and a function of performing wireless LAN communication. Each of the communication device 40, the communication device 41, and the communication device 42 has a function of performing Bluetooth (registered trademark) communication. The communication device 40, the communication device 41, and the communication device 42 has a function of performing direct wireless communication with each other. The communication device 40, the communication device 41, and the communication device 42 may perform direct communication with another communication device by using short distance direct communication according to Cellular-V2X (for example, V2V direct communication). The short distance direct communication according to Cellular-V2X includes communication schemes such as LTE-V2X PC5, and 5G-V2X PC5.

A terminal 30 is a communication terminal of a passenger of the vehicle 20. The terminal 30 is a mobile terminal such as a mobile phone or a smart phone. The terminal 30 has a function of performing mobile communication through the base station 12. In addition, the terminal 30 has a function of operating as a wireless access point. The terminal 30 has a tethering function by which a device connected to a wireless access point that is provided by the terminal 30 is relayed and connected to the communication network 90 through the base station 12.

As shown in FIG. 1, the communication device 42 can be connected to the wireless access point 14, whereas the communication device 40 and the communication device 41 cannot be connected to the wireless access point 14. The communication device 40 can perform direct communication with the communication device 41, and the communication device 41 can perform direct communication with the communication device 42. In this case, the communication device 40 compares, when communicating with the external device 70, a communication cost for communicating with the external device 70 through a first communication path that connects through the communication device 41, the communication device 42, and the wireless access point 14 with a communication cost for communicating with the external device 70 through a second communication path that connects through the terminal 30, and if the communication cost for communicating through the first communication path is lower than the communication cost for communicating through the second communication path, then selects the first communication path and communicates with the external device 70.

For example, the communication device 40 obtains communication cost information for the communication device 41 to perform direct communication with another communication device or a wireless access point, and communication cost information for the communication device 42 to perform direct communication with another communication device. For example, the communication cost information for the communication device 41 may be price information representing a price to be imposed on a contractor of the communication device 41 when, for example, the communication device 41 has performed direct communication with another communication device. The communication cost information may be price information representing a price to be imposed per unit data amount when direct communication is performed.

Each of the communication device 40, the communication device 41, and the communication device 42 obtains communication environment information from a communication device of another vehicle by broadcasting request information for requesting the communication environment information. For example, in response to receiving the request information from the communication device 41, the communication device 42 transmits communication environment information 52 to the communication device 41. In response to receiving the request information from the communication device 40, the communication device 41 transmits communication environment information 51 to the communication device 40.

Each of the communication environment information 51 and the communication environment information 52 includes data items of "VID", "Wi-Fi (registered trademark) connection", "cost", and "direct communication". The "VID" is vehicle identification information of an own vehicle. The "Wi-Fi (registered trademark) connection" is information representing whether wireless LAN connection can be established with a wireless access point. The "cost" is communication cost information. The "direct communication" is information representing VID of a vehicle including another communication device that can perform direct communication.

For example, the communication environment information 52 shows that the communication device 42 can establish wireless LAN connection with a wireless access point, a communication cost is Y2 yen per unit data amount, and no vehicle is available for direct communication. The communication environment information 51 includes communication environment information 51-1 and communication environment information 51-2. The communication environment information 51-1 is set to the same information as the communication environment information 52 received from the communication device 42. The communication environment information 51-1 is communication environment information of the communication device 41. The communication environment information 51-1 shows that the communication device 41 cannot establish wireless LAN connection with a wireless access point, a communication cost is Y1 yen per unit data amount, and can perform direct communication with the communication device 42 of the vehicle 22 of which VID is X2 and the communication device 40 of the vehicle 20 of which VID is X0.

The communication device 40 determines, based on the communication environment information 51 received from the communication device 40, that the communication device 41 can perform direct communication with the communication device 42, and the communication device 42 is connectable to a wireless access point. In addition, the communication device 40 calculates, based on the communication environment information 51, a communication cost C1 for transmitting an amount A of data to the external device 70 through a communication path that connects through the communication device 41, the communication device 42, and the wireless access point in this order to the communication network 90. For example, the communication device 40 calculates the communication cost C1 by $C1=Y0 \times A+Y1 \times A+Y2 \times A$. Here, Y0 is a cost for the communication device 40 to perform direct communication with another communication device. It is assumed that Y0 has been preset to the communication device 40 by a user of the vehicle 20.

The communication device 40 also calculates a communication cost C2 for the terminal 30 to transmit the amount A of data through the base station 12. For example, when y0 is a cost for the communication device 40 to perform direct communication with another communication device, the communication device 40 calculates the communication cost C2 by $y0 \times A$. It is assumed that y0 has been preset to the communication device 40 by a user of the terminal 30. The communication device 40 selects, when the communication cost C1 is lower than the communication cost C2, the communication path that communicates through the communication device 41, the communication device 42, and the wireless access point in this order, and then connects to the communication network 90 and transmits the data to the external device 70.

A packet of which transmission source is the communication device 40 includes contractor information of each of the communication device 41 and the communication device 42. A communication common carrier calculates, based on the contractor information included in the packet transmitted from the vehicle 20, a communication fee for communication performed through a communication path connecting from the communication device 40 being a transmission source through the communication device 41 and the communication device 42, and imposes the fee not on a contractor of the communication device 41 or the communication device 42 but a contractor of the communication device 40. This allows to appropriately impose on the contractor of the communication device 40 even when the communication device 41 and the communication device 42 relay data communication of which transmission source is the communication device 40.

As described above, according to the communication system 10, when the vehicle 20 can be connected to the wireless access point 14 by using direct communication with another vehicle, a user of the vehicle 20 can reduce a communication cost by connecting to the wireless access point 14 through a communication path using the direct communication with the other vehicle. Further, for example, when the vehicle 20 has communicated using a communication path that connects through the vehicle 21, the vehicle 22, and the wireless access point 14 in this order, users of the vehicle 21 and the vehicle 22 are ensured that a communication fee to occur from the data communication having a transmission source being the vehicle 20 is never charged on them. Therefore, an appropriate communication fee can be charged on the user of the vehicle 20.

Figure 2:
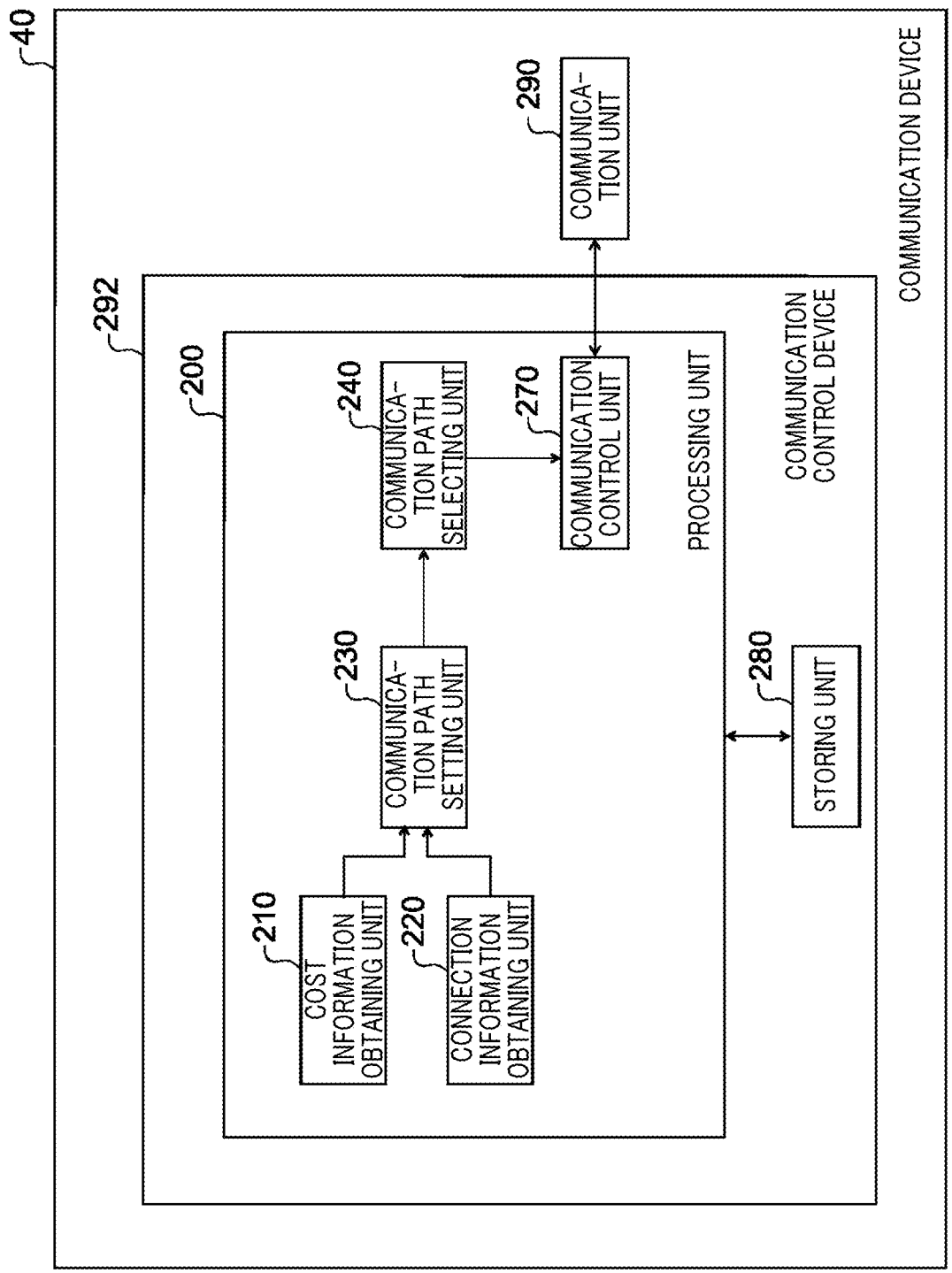
FIG. 2 shows a system configuration of a communication device 40.

FIG. 2 shows a system configuration of the communication device 40. The communication device 40 includes a communication unit 290 and a communication control device 292. The communication unit 290 communicates with outside. For example, the communication unit 290 performs direct communication with a communication device of another vehicle. The communication unit 290 may be implemented by TCU (Telematics Control Unit).

The communication control device 292 controls wireless communication performed by the vehicle 20. The communication control device 292 controls the communication unit 290. The communication control device 292 includes a processing unit 200 and a storing unit 280. The processing unit 200 is implemented by an arithmetic processing device including a processor, for example. The storing unit 280 is implemented with a non-volatile storage media included therein. At least a part of the processing unit 200 and the storing unit 280 may be implemented by an ECU (Electronic Control Unit) that contains a microcomputer including a CPU, ROM, RAM, I/O, a bus, and the like. The processing unit 200 uses information stored in the storing unit 280 for processing.

The processing unit 200 includes a cost information obtaining unit 210, a connection information obtaining unit 220, a communication path setting unit 230, a communication path selecting unit 240, and a communication control unit 270. The cost information obtaining unit 210 obtains, from another vehicle 20 being in surroundings of the vehicle 20, cost information representing a cost for the other vehicle 20 to perform direct wireless communication with the vehicle 20. The connection information obtaining unit 220 obtains communication connection information that is available to the other vehicle 20. The cost information may be information set for the data item of "cost" included in the communication environment information described above. The communication connection information may be information set for the data items of "direct communication" and "Wi-Fi (registered trademark) connection" of the communication environment information described above.

The communication path setting unit 230 sets a plurality of communication paths including a communication path using direct communication with the other vehicle 20 based on the communication connection information. For example, the communication path setting unit 230 selects, as one communication path, a communication path that connects through the communication device 41 and the communication device 42 in this order. The communication path selecting unit 240 selects, based on the cost information obtained by the cost information obtaining unit 210 and the communication connection information obtained by the connection information obtaining unit 220, a communication path to be used for data communication among the plurality of the communication paths. Specifically, the communication path selecting unit 240 selects, based on the cost information obtained by the cost information obtaining unit 210 and the communication connection information obtained by the connection information obtaining unit 220, a communication path of the lowest cost among the plurality of communication paths.

An ending point of the communication path using direct communication with the other vehicle 20 is a vehicle 20 capable of being communicably connected to an internet network by using short range radio communication. For example, in the example of FIG. 1, the ending point of the communication path is the vehicle 22 capable of being communicably connected to an internet network by using wireless LAN communication.

The communication control unit 270 executes broadcasting of request information for requesting communication connection information available for another vehicle 20. In response to the request information, the connection information obtaining unit 220 obtains from the other vehicle 20, the communication connection information available for the other vehicle 20. The request information may request the cost information representing the cost for the other vehicle 20 to perform the direct wireless communication with the vehicle 20. In response to the request information, the cost information obtaining unit 210 obtains the cost information representing the cost for the other vehicle 20 to perform the direct wireless communication with the vehicle 20. The request information described in connection with FIG. 1 is one example of the request information for requesting the communication connection information and the cost information.

Figure 3:
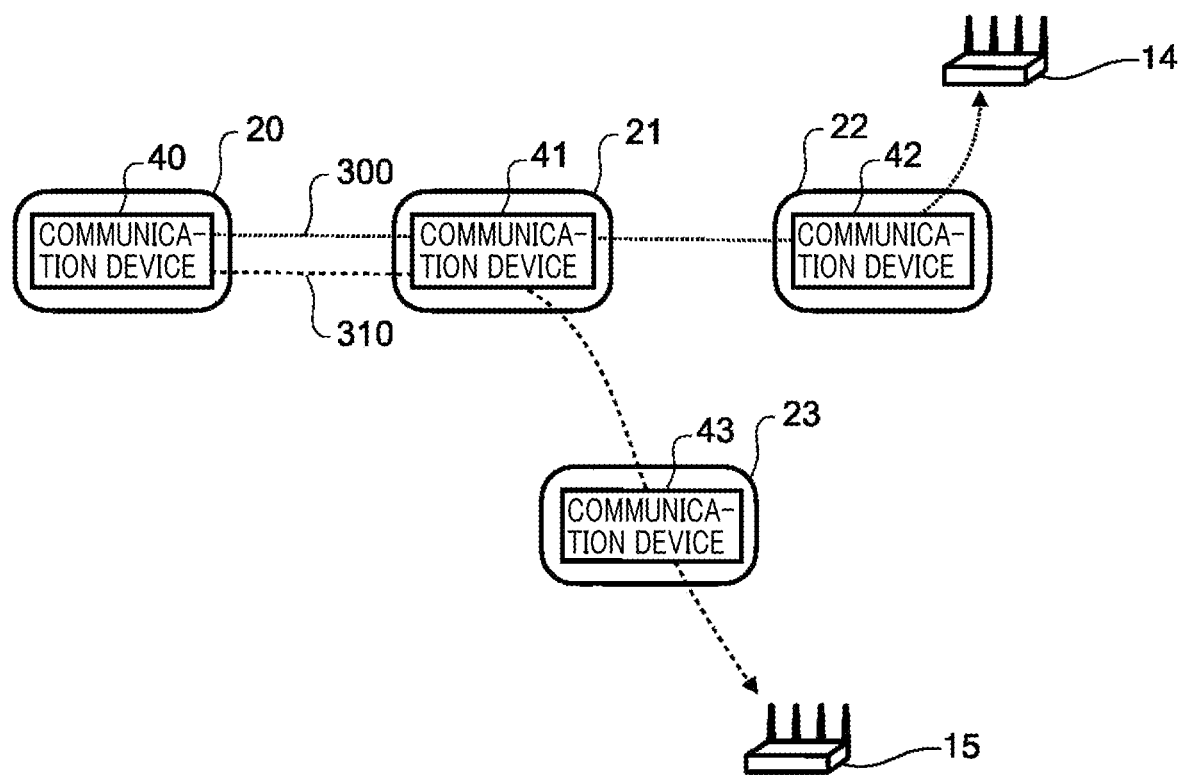
FIG. 3 schematically shows one example of when setting a plurality of communication paths including direct communication.

FIG. 3 schematically shows one example of when setting a plurality of communication paths including direct communication. FIG. 3 shows a situation in which, in the communication system 10 described in connection with FIG. 1, there are a vehicle 23 in addition to the vehicle 20, the vehicle 21, and the vehicle 22, and a wireless access point 15 being connectable to the vehicle 23 in addition to the wireless access point 14.

The vehicle 23 includes a communication device 43. The communication device 43 has the same function as that of the communication device 40, the communication device 41, and the communication device 42. As described in connection with FIG. 1, a communication path 300 of FIG. 3 connects through the communication device 41, the communication device 42, and the wireless access point 14 in this order.

In FIG. 3, the vehicle 23 is at a location where the communication device 43 of the vehicle 23 can perform direct communication with the communication device 41 of the vehicle 21. The communication device 41 transmits, when having received request information from the communication device 40, communication environment information including communication environment information of the communication device 43 in addition to the communication environment information of the communication device 42 and the communication device 41 to the communication device 40. In this case, the communication path setting unit 230 of the communication device 40 sets, based on the communication environment information and in addition to the communication path 300, a communication path 310 that connects through the communication device 41, the communication device 43, and the wireless access point 15 in this order.

As described in connection with FIG. 1, the communication path selecting unit 240 calculates, based on the communication environment information, a communication cost C1 for connecting through the communication path 300 as well as a communication cost C3 for connecting through the communication path 310. Then, the communication path selecting unit 240 selects, when the communication cost C3 is the lowest between the communication cost C1, the communication cost C2 described above, and the communication cost C3, the communication path 300 as a communication path to be used for transmitting data.

Figure 4:
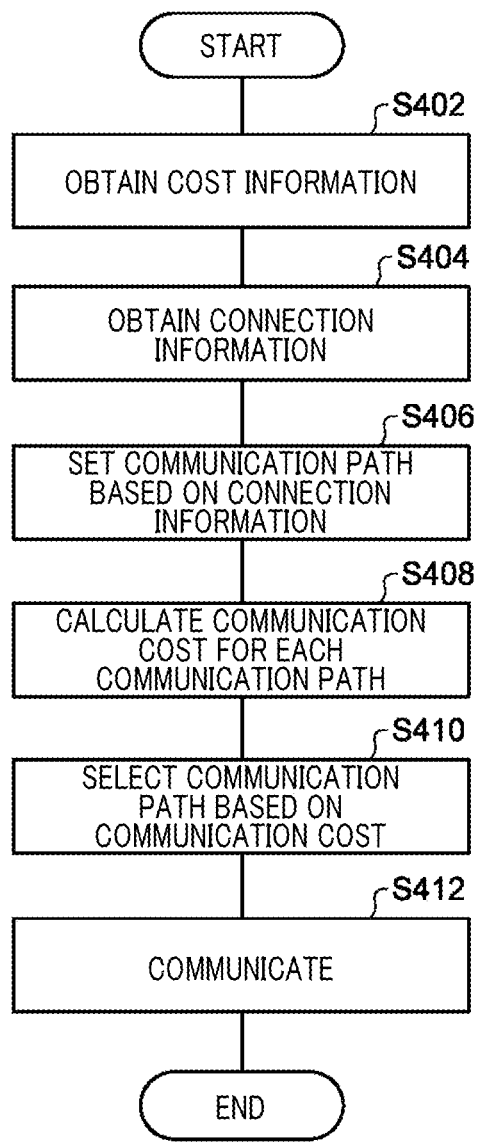
FIG. 4 is a flowchart showing one example of a processing procedure executed by the communication device 40.

FIG. 4 is a flowchart showing one example of a processing procedure executed by the communication device 40. The processing of this flowchart starts when data communication is performed with the external device 70. In S402, the cost information obtaining unit 210 obtains the cost information. In S404, the connection information obtaining unit 220 obtains the connection information.

Note that, the cost information obtaining unit 210 may obtain the cost information from pre-collected communication environment information, and the connection information obtaining unit 220 may obtain the connection information from pre-collected communication environment information. Alternatively, when the communication device 40 starts data communication with the external device 70, the communication control unit 270 may cause the communication unit 290 to transmit request information by broadcasting, and the cost information obtaining unit 210 and the connection information obtaining unit 220 may obtain cost information and connection information, respectively, from communication environment information received from another vehicle in response to the request information.

In S406, the communication path setting unit 230 sets a communication path based on the connection information. In S408, the communication path selecting unit 240 calculates a communication cost for each communication path based on the cost information and the connection information. In S410, the communication path selecting unit 240 selects a communication path based on the communication cost of the each communication path.

In S412, the communication control unit 270 controls the communication unit 290, and performs data communication with the external device 70 by using the communication path selected in S410. The communication control unit 270 may control the communication unit 290, notify a communication device of another vehicle 20 on the communication path selected in S410 of communication path information from the communication device 40 to a wireless access point, and instruct each communication device to routes a packet, which has a transmission source being the vehicle 20, according to communication path information.

According to the above-described communication system 10, the communication device 40 of the vehicle 20 can communicate with the external device 70 through a wireless access point by using a communication path including direct communication between vehicles, thereby a communication cost can be reduced. Further, a contractor of a communication device of another vehicle is ensured that a communication fee to occur from data communication having a transmission source being the vehicle 20 is never charged on the contractor.

Note that, whereas the present embodiment has mainly described about an example for determining a communication path when transmitting data, the present embodiment may also be adapted for an embodiment in which a communication path is set for receiving data.

In the present embodiment, a cost included in the communication environment information may be set to a price to be imposed as a communication fee per unit data amount, for example. If a fee for direct communication is imposed at a fixed rate, then a value multiplying the fixed rate fee by a predetermined constant may be set as the cost included in the communication environment information.

The communication environment information to be transmitted to the communication device 41, the communication device 42, and the communication device 43 may also include information representing communication quality of direct communication. The communication path selecting unit 240 may selects a communication path based further on the information representing communication quality included in the communication environment information. For example, the communication path selecting unit 240 may select, among a plurality of communication paths, a communication path being communicable at a communication quality of predetermined reference value or more.

As described in connection with the above embodiments, the vehicle 20 may be an automobile. The vehicle 20 may be an automobile mounting an internal combustion engine. The vehicle 20 may be an electric automobile mounting a battery as an electric power source for driving. The vehicle 20 may be an electric automobile mounting a fuel battery as an electric power source for driving. The vehicle 20 may be a saddle-type vehicle. The vehicle 20 may be an electric vehicle. The vehicle 20 is one example of transportation equipment. The vehicle 20 may be a mobile object other than an automobile.

Figure 5:
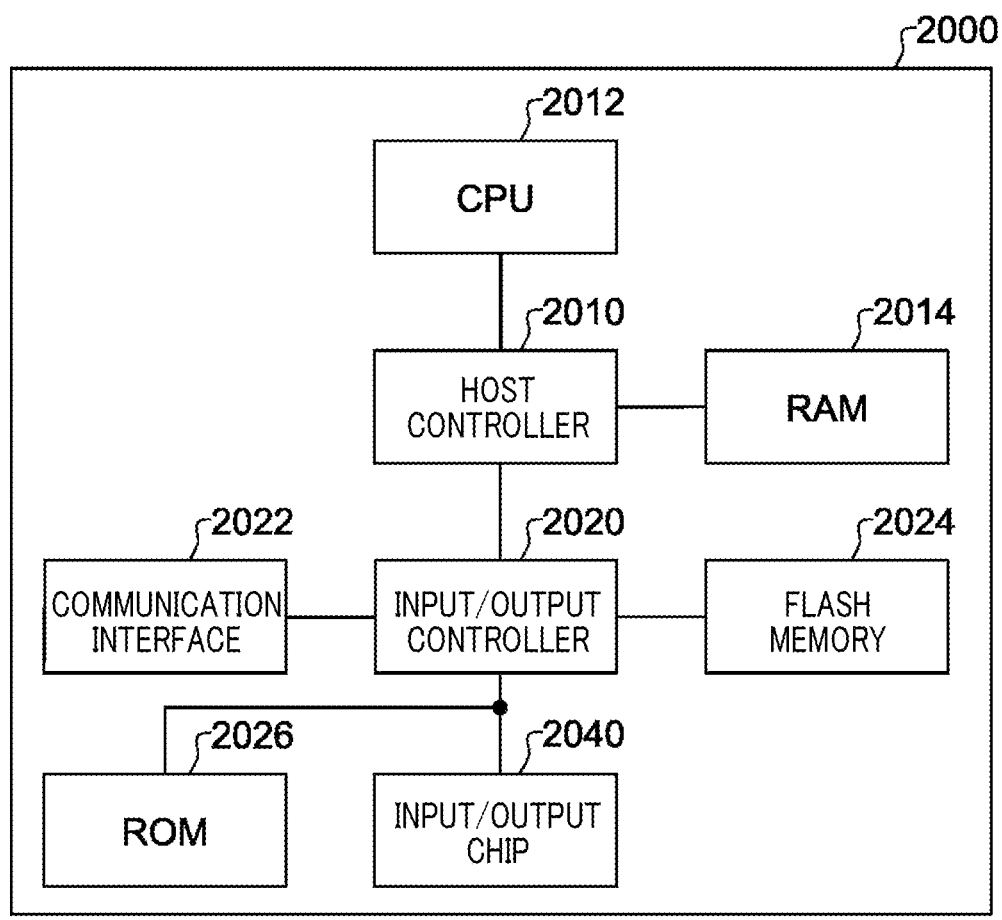
FIG. 5 shows an example of a computer 2000.

FIG. 5 shows an example of a computer 2000 in which a plurality of embodiments of the present invention can be embodied entirely or partially. A program installed in the computer 2000 can cause the computer 2000 to: function as a device such as the communication control device according to the embodiments or each unit of this device; execute an operation associated with this device or the each unit of this device; and/or execute a process according to the embodiment or a step of this process. Such a program may be executed by a CPU 2012 in order to cause the computer 2000 to execute a specific operation associated with some or all of the processing procedures and the blocks in the block diagrams described in the present specification.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with another electronic device via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a universal serial bus (USB) port, a high-definition multimedia interface (HDMI (registered trademark)) port.

The programs are provided through a computer-readable storage medium, such as a CD-ROM, a DVD-ROM, or a memory card, or through a network. The RAM 2014, the ROM 2026, or the flash memory 2024 is an example of the computer-readable storage medium. The program is installed in the flash memory 2024, the RAM 2014 or the ROM 2026 and executed by the CPU 2012. Information processing written in these programs is read by the computer 2000, and provides cooperation between the programs and the various types of hardware resources mentioned above. An apparatus or a method may be configured by implementing operations or processing of information according to a use of the computer 2000.

For example, when communication is performed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and execute various types of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various types of processing including various types of operations, information processing, conditional judgement, conditional branching, unconditional branching, information retrieval and replacement, or the like described in the present specification and specified by instruction sequences of the programs, and write back a result into the RAM 2014. In addition, the CPU 2012 may search for information in a file, a database, or the like in the recording medium. For example, when a plurality of entries, each having an attribute value of a first attribute associated with an attribute value of a second attribute, is stored in the recording medium, the CPU 2012 may search for an entry having a designated attribute value of the first attribute that matches a condition from the plurality of entries, and read the attribute value of the second attribute stored in the entry, thereby obtaining the attribute value of the second attribute associated with the first attribute that satisfies a predetermined condition.

The program or software module described above may be stored on the computer 2000 or in a computer-readable storage medium near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

A program which has been installed on the computer 2000 and causes the computer 2000 to function as the communication control device 292 may approach the CPU 2012 or the like so as to cause the computer 2000 to function as each unit of the communication control device 292. Information processing written in these programs function as, when read by the computer 2000, each unit of the communication control device 292 being a specific means provided by cooperation of software and the above-described hardware resources of various types. When these specific means successfully calculate or process information corresponding to a purpose of use of the computer 2000 in the present embodiment, a particular communication control device 292 corresponding to the purpose of use is configured.

Various embodiments have been described with reference to the block diagrams and the like. In the block diagrams, each block may represent (1) a step of a process in which an operation is executed, or (2) each unit of the apparatus having a role in executing the operation. Certain steps and units may be implemented by dedicated circuitry, programmable circuitry supplied together with computer-readable instructions stored on computer-readable storage media, and/or processors supplied together with computer-readable instructions stored on computer-readable storage media. The dedicated circuitry may include a digital and/or analog hardware circuit, or may include an integrated circuit (IC) and/or a discrete circuit. The programmable circuitry may include a reconfigurable hardware circuit including logical AND, logical OR, logical XOR, logical NAND, logical NOR, and other logical operations, and a memory element such as a flip-flop, a register, a field programmable gate array (FPGA), a programmable logic array (PLA), or the like.

The computer-readable storage medium may include any tangible device capable of storing an instruction executed by an appropriate device. As a result, the computer-readable storage medium having the instruction stored thereon constitutes at least a part of a product including an instruction that may be executed in order to provide a means to execute an operation specified by a processing procedure or a block diagram. Examples of the computer-readable storage medium may include an electronic storage medium, a magnetic storage medium, an optical storage medium, an electromagnetic storage medium, a semiconductor storage medium, or the like. More specific examples of the computer-readable storage medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

The computer-readable instruction may include either a source code or an object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

Computer-readable instructions may be provided to a processor of a general purpose computer, a special purpose computer, or other programmable data processing apparatus, or to programmable circuitry, locally or via a local area network (LAN), wide area network (WAN) such as the Internet, and a computer-readable instruction may be executed to provide means for executing operations specified in the described processing procedures or block diagrams. Examples of the processor include a computer processor, a processing unit, a microprocessor, a digital signal processor, a controller, a microcontroller, and the like.

While the embodiments of the present invention have been described, the technical scope of the present invention is not limited to the above described embodiments. It is apparent to persons skilled in the art that various alterations and improvements can be added to the above described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, specification, or diagrams can be performed in any order as long as the order is not indicated by "prior to," "before," or the like and as long as the output from a previous process is not used in a later process. Even if the operation flow is described using phrases such as "first" or "next" in the claims, specification, or diagrams, it does not necessarily mean that the process must be performed in this order.

EXPLANATION OF REFERENCES

10: communication system;
12: base station;
14, 15: wireless access point;
20, 21, 22, 23: vehicle;
30: terminal;
40, 41, 42, 43: communication device;
51: communication environment information;
52: communication environment information;
70: external device;
90: communication network;
200: processing unit;
280: storing unit;
290: communication unit;
210: cost information obtaining unit;
220: connection information obtaining unit;
230: communication path setting unit;
240: communication path selecting unit;
270: communication control unit;
292: communication control device;
300, 310: communication path;
2000: computer;
2010: host controller;
2012: CPU;
2014: RAM;
2020: input/output controller;
2022: communication interface;
2024: flash memory;
2026: ROM;
2040: input/output chip

What is claimed is:

1. A communication control device for controlling wireless communication of a mobile object, comprising:
a cost information obtaining unit for obtaining, from one or more other mobile objects being in surroundings of the mobile object, cost information representing a cost for the one or more other mobile objects to perform direct wireless communication with the mobile object and direct wireless communication between the one or more other mobile objects;
a connection information obtaining unit for obtaining communication connection information available for the one or more other mobile objects;
a communication path setting unit for setting, based on the communication connection information, a plurality of communication paths including a communication path using direct communication with the one or more other mobile objects; and
a communication path selecting unit for selecting, based on the cost information obtained by the cost information obtaining unit and the communication connection information obtained by the connection information obtaining unit, a communication path to be used by the mobile object for data communication among the plurality of communication paths, wherein
the mobile object and the one or more other mobile objects are vehicles, and
the direct communication is V2V direct communication according to Cellular-V2X.

2. The communication control device according to claim 1, wherein the communication path selecting unit is configured to select, based on the cost information obtained by the cost information obtaining unit and the communication connection information obtained by the connection information obtaining unit, a communication path of a lowest cost among the plurality of communication paths.

3. The communication control device according to claim 1, wherein an ending point of the communication path using the direct communication with the one or more other mobile objects is a mobile object capable of being communicably connected to an internet network by using short range radio communication.

4. The communication control device according to claim 1, further comprising:
a communication control unit for executing broadcasting of request information for requesting communication connection information available for the one or more other mobile objects, wherein
the connection information obtaining unit is configured to obtain, from the one or more other mobile objects and in response to the request information, the communication connection information available for the one or more other mobile objects.

5. The communication control device according to claim 4, wherein
the request information is configured to request cost information representing a cost for the one or more other mobile objects to perform the direct wireless communication with the mobile object and the direct wireless communication between the one or more other mobile objects, and
the cost information obtaining unit is configured to obtain, in response to the request information, cost information representing the cost for the one or more other mobile objects to perform the direct wireless communication with the mobile object and the direct wireless communication between the one or more other mobile objects.

6. A mobile object, comprising:
the communication control device of claim 1.

7. The communication control device according to claim 2, wherein an ending point of the communication path using the direct communication with the one or more other mobile objects is a mobile object capable of being communicably connected to an internet network by using short range radio communication.

8. The communication control device according to claim 2, further comprising:
a communication control unit for executing broadcasting of request information for requesting communication connection information available for the one or more other mobile objects, wherein
the connection information obtaining unit is configured to obtain from the one or more other mobile objects and in response to the request information, the communication connection information available for the one or more other mobile objects.

9. The communication control device according to claim 3, further comprising:
a communication control unit for executing broadcasting of request information for requesting communication connection information available for the one or more other mobile objects, wherein
the connection information obtaining unit is configured to obtain from the one or more other mobile objects and in response to the request information, the communication connection information available for the one or more other mobile objects.

10. The communication control device according to claim 7, further comprising:

a communication control unit for executing broadcasting of request information for requesting communication connection information available for the one or more other mobile objects, wherein the connection information obtaining unit is configured to obtain from the one or more other mobile objects and in response to the request information, the communication connection information available for the one or more other mobile objects.

11. The communication control device according to claim 8, wherein the request information is for requesting cost information representing a cost for the one or more other mobile objects to perform the direct wireless communication with the mobile object and the direct wireless communication between the one or more other mobile objects, and the cost information obtaining unit is configured to obtain, in response to the request information, cost information representing the cost for the one or more other mobile objects to perform the direct wireless communication with the mobile object and the direct wireless communication between the one or more other mobile objects.

12. The communication control device according to claim 9, wherein the request information is for requesting cost information representing a cost for the one or more other mobile objects to perform the direct wireless communication with the mobile object and the direct wireless communication between the one or more other mobile objects, and the cost information obtaining unit is configured to obtain, in response to the request information, cost information representing the cost for the one or more other mobile objects to perform the direct wireless communication with the mobile object and the direct wireless communication between the one or more other mobile objects.

13. The communication control device according to claim 10, wherein the request information is for requesting cost information representing a cost for the one or more other mobile objects to perform the direct wireless communication with the mobile object and the direct wireless communication between the one or more other mobile objects, and the cost information obtaining unit is configured to obtain, in response to the request information, cost information representing the cost for the one or more other mobile objects to perform the direct wireless communication with the mobile object and the direct wireless communication between the one or more other mobile objects.

14. A communication control method for controlling wireless communication of a mobile object, comprising:

obtaining, from one or more other mobile objects being in surroundings of the mobile object, cost information representing a cost for the one or more other mobile objects to perform direct wireless communication with the mobile object and direct wireless communication between the one or more other mobile objects;

obtaining communication connection information available for the one or more other mobile objects;

setting, based on the communication connection information, a plurality of communication paths including a communication path using direct communication with the one or more other mobile objects; and selecting, based on the cost information and the communication connection information, a communication path to be used by the mobile object for data communication among the plurality of communication paths, wherein the mobile object and the one or more other mobile objects are vehicles, and the direct communication is V2V direct communication according to Cellular-V2X.

15. A non-transitory computer-readable storage medium stored therein a program, wherein the program causes a computer for controlling wireless communication of a mobile object to function as:

a cost information obtaining unit for obtaining, from one or more other mobile objects being in surroundings of the mobile object, cost information representing a cost for the one or more other mobile objects to perform direct wireless communication with the mobile object and direct wireless communication between the one or more other mobile objects;

a connection information obtaining unit for obtaining communication connection information available for the one or more other mobile objects;

a communication path setting unit for setting, based on the communication connection information, a plurality of communication paths including a communication path using direct communication with the one or more other mobile objects; and a communication path selecting unit for selecting, based on the cost information obtained by the cost information obtaining unit and the communication connection information obtained by the connection information obtaining unit, a communication path to be used by the mobile object for data communication among the plurality of communication paths, wherein the mobile object and the one or more other mobile objects are vehicles, and the direct communication is V2V direct communication according to Cellular-V2X.

* * * * *